United States Patent
Lee et al.

(10) Patent No.: US 6,913,826 B2
(45) Date of Patent: Jul. 5, 2005

(54) BIODEGRADABLE POLYESTER POLYMER AND METHOD FOR PREPARING THE SAME USING COMPRESSED GAS

(75) Inventors: Youn-Woo Lee, Seoul (KR); Soo Hyun Kim, Seoul (KR); Young Ha Kim, Seoul (KR); Jong Sung Lim, Seoul (KR); Jong Min Park, Seoul (KR); Ji Won Pack, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 93 days.

(21) Appl. No.: 10/682,760

(22) Filed: Oct. 8, 2003

(65) Prior Publication Data

US 2004/0072985 A1 Apr. 15, 2004

(30) Foreign Application Priority Data

Oct. 8, 2002 (KR) ................................. 10-2002-0061272

(51) Int. Cl.[7] .......................... B32B 21/02; C08G 63/82
(52) U.S. Cl. ...................... 428/402; 528/355; 528/357; 528/359; 525/461; 525/471; 526/62; 526/65; 524/755; 524/765; 524/770; 524/783; 524/784; 524/786
(58) Field of Search ................................. 528/355, 357, 528/359; 525/461, 471; 428/402; 526/62, 65; 524/755, 765, 770, 783, 784, 786

(56) References Cited

PUBLICATIONS

David D. Hile and M.V. Pishko, "Ring–opening precipitation polymerization of poly (D,L–lactide–co–glycolide) in supercritical carbon dioxide", Macromol. Rapid Commun., vol. 20, No. 10, pp. 511–514 (1999).

David D. Hile, Michael V. Pishko, "Emulsion Copolymerization of D,L–Lactide and Glycolide in Supercritical Carbon Dioxide", J. Polym., Sci.: Polym. Chem. 39, pp. 562–570 (2001).

Primary Examiner—Samuel A. Acquah
(74) Attorney, Agent, or Firm—Darby & Darby

(57) ABSTRACT

In polymerizing biodegradable polymer material, a compressed gas is used as a reaction solvent for a solution-polymerization, in order to prepare biodegradable polyester homopolymer and copolymer with a high molecular weight in a fine powder form with a particle size of 0.01~1000 μm.

20 Claims, 1 Drawing Sheet

BIODEGRADABLE POLYESTER POLYMER AND METHOD FOR PREPARING THE SAME USING COMPRESSED GAS

BACKGROUND OF THE INVENTION

1. Field of the Invention

The present invention relates to a method for preparing biodegradable polyester using compressed gas as a reaction solvent, and biodegradable polyester prepared thereby.

2. Description of the Background Art

A degradable polymer material is much favored in various fields such as the medical science, the science of agriculture, and environment, due to its specific degradable characteristics. Especially, the degradable polymer material has sharply increasing values in the field of the environment and the medical science.

The biodegradable polymer is roughly divided into a natural biodegradable polymer and a synthetic biodegradable polymer. Out of them, the natural biodegradable polymer has a high affinity to the environment, and a high physical property and adaptability to a living body, due to being made of natural materials, and for these reasons it is recognized as a preferable material. But, the natural biodegradable polymer has such problems that it is high-priced and cannot be arbitrarily controlled due to the characteristics of the natural material.

Meanwhile, recently, the synthetic biodegradable polymer is highly commercially valued in the aspect that it can be artificially controlled unlike the natural biodegradable polymer, to complement the above problems of the natural biodegradable polymer. Among the synthetic biodegradable polymer materials, polyglycolide (PGA), polylactide (PLA) or the like are comparatively excellent in its property, and variously used in the environment and medical fields, due to its high affinity and innoxiousness to the environment and the living body. Especially, the synthetic biodegradable polymer material is usable in the environment-related fields such as a disposable wrap film, an agricultural and industrial film, and food packing container. Further, the synthetic biodegradable polymer material has been developed and used in the medical field such as a drug delivery system (DDS), a pins, screw and suture for fixing bone and tissue.

In order to prepare the synthetic biodegradable polymer with high molecular weight, in general, a solid polymerization process is conducted using only monomer and catalyst, without solvent, wherein the monomer is polymerized at below a melting temperature of polymer. However, such solid polymerization process inevitably results in an ununiformity of physical properties, an adulteration of low molecular weight materials and a lowering of workability. In particular, in order to apply a polymer prepared in the large-scaled solid state to a shaping process, the polymer should be crushed to a small size, which makes a preparation process complicate in a mass-production of a commercial scale, and increases a production cost. In addition, in the use for the DDS, it is necessary that the form and the size of particles should be freely controlled in order to arbitrarily control a speed of a medicine-release.

In order to prepare polylactide/polyglycolide copolymer usable as a biodegradable and biocompatible material, researches have been conducted for a ring opening polymerization method by using alkyl lactate monomer, stabilizer, metal compound catalyst, and supercritical carbon dioxide as a dispersion medium (*Macromol. Rapid Commun*, 20, 511–514, 1999, *J. Polym. Sci. Part A: Polym. Chem*. 39, 562–570, 2001). Because polylactide/polyglycolide copolymer prepared by using the above method is insoluble to the supercritical carbon dioxide, a fluoropolymer is used as a stabilizer. However, in this method, when a reaction time is 48–72 hours, the molecular weight of the copolymer is 28,000–30,000 g/mol, indicating that the molecular weight is very low for the long reaction time.

Thus, the existing biodegradable polyester polymerized with the supercritical carbon dioxide as a dispersion medium is insoluble to the supercritical carbon dioxide used, to involve a long reaction time and a low molecular weight. Further, a stabilizer is needed in the preparation process thereof, to involve an additional process for removing the stabilizer after the reaction is finished.

Meanwhile, carbon dioxide as the supercritical fluid is frequently used for the reason of its low critical temperature and critical pressure, a low cost, incombustibility and innoxiousness. However, the supercritical carbon dioxide is not able to dissolve polymers except for fluoride-containing polymers and silicon-containing (e.g., siloxane) polymers.

Hydrocarbons and hydrochlorofluorocarbons (HCFCs) are known to well dissolve various polymers with high molecular weight when being used as a solvent. Meilchen et al. observed that poly(methylacrylate) and poly(ethylene-co-methacrylate) was dissolved in hydrochlorofluoromethane (HCFC-22). Haschets and Shine observed a phase change of poly(methylmethacrylate) and polycaprolactone in the presence of HCFC-22. The phenomenon that above polymer is dissolved in HCFC-22 occurs presumably by a special interaction between hydrogen atom in HCFC-22 and an ester group in polymer.

In order to resolve the aforementioned problems of the conventional methods for preparing biodegradable polyester in the solid process or using the supercritical $CO_2$, the present invention provides the polymerization system consisting of an hydrofluorocarbons (HFCs) and/or HCFCs and/or dimethylethers, and the like, which are in a supercritical state and can be used for a solution-polymerization.

According to the present invention, compressed gas capable of dissolving polymer is used as a reaction solvent, to prepare polymer in a particle form with a high molecular weight within a short reaction time. In addition, differently from the conventional polymerization method using the supercritical carbon dioxide as the dispersion medium, the present invention does not need a stabilizer, to omit a process for removing the stabilizer, and thereby, the preparation process can be more simplified.

After the polymerization is completed as above, in a follow-up process, a product in a reactor is sprayed into a precipitator, and a non-solvent which dissolves a reaction solvent without dissolving the polymer to form a single phase is introduced. Thereby, a biodegradable homopolymerized polyester and a biodegradable copolymerized polyester with high molecular weight can be obtained in a fine powder form with a particle size of 0.01 to 1000 μm. That is, according to the present invention, a biodegradable polyester with a high molecular weight can be synthesized by a single consecutive process.

SUMMARY OF THE INVENTION

Therefore, an object of the present invention is to provide a method for preparing biodegradable polyester homopolymer or copolymer with high molecular weight in a single consecutive process by a solution-polymerization using compressed gas as a solvent, differently from a conventional method for preparing biodegradable polyester by polymerizing in a solid process.

Another object of the present invention is to provide a method for preparing a biodegradable polyester with high molecular weight in a fine particle form without a polymerizing solvent and polymers with low molecular weight.

To achieve these and other advantages and in accordance with the purpose of the present invention, as embodied and broadly described herein, there is provided a method for preparing a biodegradable polyester in which a polymer material is solution-polymerized using a compressed gas as solvent.

BRIEF DESCRIPTION OF THE DRAWINGS

The accompanying drawing, which are included to provide a further understanding of the invention and are incorporated in and constitute a part of this specification, illustrates embodiments of the invention and together with the description serves to explain the principles of the invention.

In the drawings.

DETAILED DESCRIPTION OF THE PREFERRED EMBODIMENTS

Figure 1:
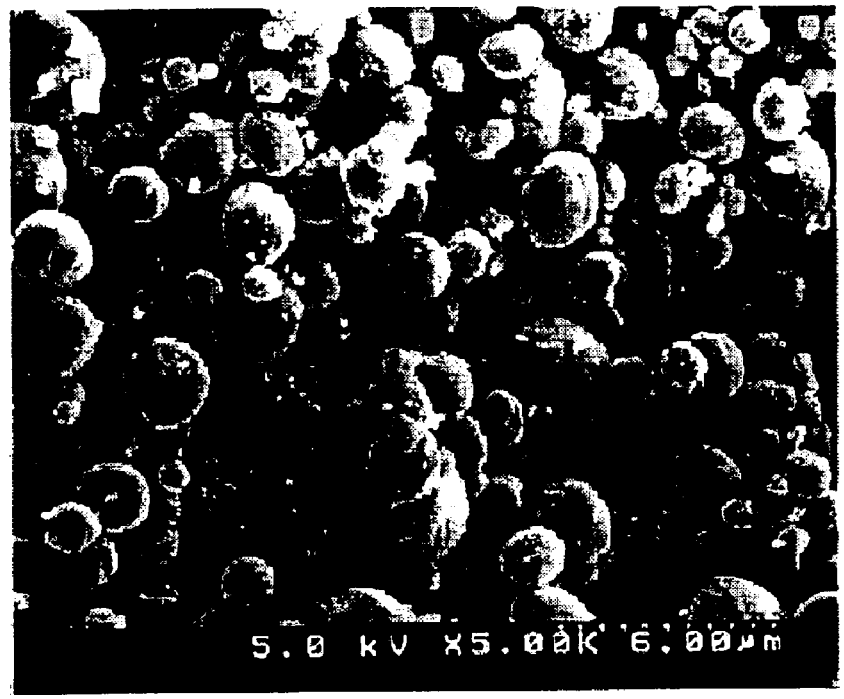
FIG. 1 shows an average particle diameter and particle size distribution of a polylactide observed by a scanning electron microscope, in which the average particle diameter of the prepared polymer is 0.6 $\mu$m and 3 $\mu$m or smaller particle diameters accounts for 95%.

The present invention relates to a method wherein a polymer material is solution-polymerized by using a compressed gas as a reaction solvent to prepare a biodegradable polyester homopolymer or copolymer with high molecular weight in a fine powder form. That is, the present invention is characterized in polymerizing a biodegradable polymer material by using a compressed gas as a reaction solvent.

In general, a supercritical fluid is defined as a material in the condition of above a critical temperature $T_c$ and a critical pressure $P_c$. Every pure gas has the critical temperature ($T_c$) at which gas cannot be liquefied even though a pressure increases, and the critical pressure ($P_c$) at which gas can be liquefied again at the critical temperature. The supercritical fluid at above the critical temperature and the critical pressure has a similar dissolving ability to a liquid and a similar viscosity to gas, so that it is expected to substitute a non-compressed organic solvent.

The supercritical fluid is used to effectively extract a residual monomer, a solvent or a catalyst from polymer. In addition, polymerization using the supercritical fluid can change a density by simply changing a pressure, so that a polymer mixture with a different molecular weight can be effectively separated.

In the polymer reaction, one of important merits to use the supercritical fluid in a continuous phase is that a property of solvent, such as a dielectric constant, can be controlled by simply changing a temperature or a pressure of a system, whereby a solubility of polymer can be controlled.

For example, carbon dioxide as a supercritical fluid is used for a uniform solution polymerization of homopolymer or copolymer such as fluoride-containing polymers and/or silicon-containing polymers due to its dissolving ability specific for these polymers. However, in preparing other polymers except for the above polymers, they are insoluble to the supercritical carbon dioxide, so that a stabilizer is used to perform an ununiform polymerization.

Meanwhile, HCFC-22 is a supercritical fluid having a comparatively easily accessible critical point such as $T_c$ at 96° C. and $P_c$ of 50 bar. Further, HCFC-22 exhibits a high dissolving ability for polymers even such as polyester with high molecular weight by a specific interaction between its hydrogen atom and ester group in polymer.

HCFC-22 solvent has the following merits.

(1) it can dissolve monomer, initiator and catalyst at a reaction temperature and pressure (2) it is chemically inert to monomer (3) it is inexpensive, incombustible, innoxious and easily recyclable.

In order to use HCFC-22 as the supercritical solvent, in a reacting apparatus for the present invention, HCFC-22 coming out from container is passed through a cooler to be completely liquefied, and then, the liquefied HCFC-22 is pressurized by using a high pressure liquid pump to come into a high pressure reactor.

The high pressure reactor may be sealed to make a pressure therein up to 350 bar, which is equipped with a proportional-integral-differential temperature controller, a thermometer, a heater, a pressure gauge, a safety valve, a stirrer for stirring a reactant, a speed controller, and a tachometer for measuring a speed.

The reaction can be performed in a batch or consecutive operation.

The method for preparing polymer according to the solution polymerization by using the supercritical fluid (compressed gas) solvent and monomer will be described in detail, as follows.

A cyclic monomer and a compressed gas (hereinafter, 'a compressed gas' refers to 'a supercritical fluid') as a reaction solvent are put in a high pressure reactor. As the monomer, one or two are selected from the group consisting of lactides, lactones, cyclic carbonates, cyclic anhydrides and thiolactones, to synthesize aliphatic polyester or polyester copolymer. In addition, as the monomer, a compound (A) represented by the below general formula (I) and/or a compound (B) represented by the below general formula (II) can be also used:

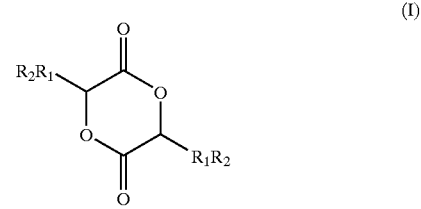

(I)

(wherein $R_1$ and $R_2$ are hydrogen atom or alkyl group of $C_1$–$C_4$.)

(II)

(wherein n is 2–5.).

It may be preferable that the compound (A) is lactide such as L-lactide, D-lactide or D,L-lactide or glycolide, and the compound (B) is caprolactone with n=5, and especially, ε-caprolactone.

In the method according to the present invention, as a reaction solvent, HFC-23, HFC-32, HFC-152a, HFC-143a, HFC-134a, HFC-125, HFC-227ea, HFC-236fa, HFC-245fa, HFC-254cb, $SF_6$, HFC-4-10-mee, C-318 (perfluoro Cyclobutane), HCFC-22, HCFC-141b, HCFC-142b, HCFC-225ca/cb, dimethylether, N2O, propane, butane or their mixture, or their mixture with $CO_2$ may be used.

In case of mixing $CO_2$, it is preferred that a weight fraction of $CO_2$ to an entire reaction solvent of the mixture is 20% or less. If the weight fraction of $CO_2$ is more than 20%, polymer with a high molecular weight would not be dissolved in the reaction solvent, to occur a precipitation polymerization in the reactor.

According to the method for synthesizing biodegradable polyester by using compressed gas as the solvent, polyester monomer is solution-polymerized by using compressed gas of 100° C. to 200° C. In the present invention, the reaction pressure is preferably 40–700 bar. If the pressure in the reactor is less than 40 bar, then less amount of cyclic monomer can be put in the reactor, and accordingly, less amount of polymer can be obtained, which is not preferable. If, however, the pressure in the reactor is more than 700 bar, then the overall equipment cost and operation cost would much increase due to the very high pressure, which is also not preferable. In the present invention, the reaction temperature is within the range of 25° C. to 250° C., and preferably, 100° C. to 200° C.

In an embodiment of the present invention, the compressed gas reaction solvent can completely dissolve polymer to result in a uniform solution polymerization reaction.

A ratio of monomer to the supercritical fluid used as the reaction solvent is preferably 1 wt % to 50 wt %, and more preferably, 5 wt % to 40 wt %. When the ratio of monomer to the reaction solvent is less than 5 wt %, and particularly, less than 1 wt %, polymer with a lower molecular weight is obtained. On the other hand, when the ratio of monomer to the reaction solvent is more than 50 wt %, the ratio of the synthesized polymer to the solvent would exceed 50 wt % during a pulverizing into a fine powder form after polymerization reaction, causing a problem in the formation of fine particles, such as producing aggregated particles.

In the present invention, a usual catalyst and an initiator can be used. Various materials can be used as the catalyst for preparing the biodegradable polymer according to the present invention, and the polymerization is conducted through the various reaction devices depending on the catalyst used.

As the catalyst, zinc-, tin- or aluminum-based organic metal catalyst or an acid catalyst such as zinc bis(2,2-dimethyl-3,5-heptanedionato-O,O') may be used. The typical examples of the organic metal catalyst includes a tin-based catalyst such as stannous octoate, stannous chloride, stannous oxide, stannous octylester, stannous chloride dihydrate and tetraphenyl tin; a zinc-based catalyst such as zinc powder, diethyl zinc, zinc octoate, zinc chloride and zinc oxide; and an aluminum-based catalyst such as aluminum chloride and aluminum ethoxide. Among them, stannous octoate or aluminum chloride may be especially preferred.

As the initiator, 1,6-hexanediol which is a dihydric alcohol, or the like, may be used.

In the present invention, the molecular weight of the synthesized polymer may be controlled by a kind and concentration of the reaction solvent, a kind and an added amount of the catalyst, polymerization temperature, polymerization pressure and polymerization time.

The addition amounts of the catalyst and the initiator may be preferably within the range of $1.0 \times 10^{-4}$ to $1.0 \times 10^{-2}$ based on 1 mole of monomer, respectively. When the respective amount is greater than $1.0 \times 10^{-2}$ based on monomer 1 mole, the concentration of the initiator acting as a molecular weight control agent would be high, whereby the molecular weight of the synthesized polymer is less than 10,000 g/mol, and the high amount of the catalyst results in making the reaction speed faster than the range which can be controlled. Meanwhile, when the respective amount is smaller than $1.0 \times 10^{-4}$, the concentrations of the initiator and the catalyst are very low to lengthen a reaction time, resulting in that longer than 48 hours would be taken to obtain polymer with the intended molecular weight and an operation cost of the reactor would be increased.

In addition, in preparation of biodegradable polyester according to the present invention, it is preferred that the reaction time is 0.2–50 hours, the conversion rate is 70% or more.

When the polymerization reaction is completed, a polymerized product in the reactor is sprayed into a precipitator. Wherein, a reaction solvent is additionally added in the reactor to maintain the constant pressure inside the reactor. Thereafter, an antisolvent, which is dissolved with the polymer solvent to form a single phase but does not dissolve the obtained polymer, is selected and added in the precipitator. Then, as the polymer solvent and the antisolvent are mixed in the precipitator, polymer is precipitated. In order to mix the antisolvent, the polymerized product in the polymerization reactor may be introduced into the precipitator with the antisolvent therein, or the antisolvent may be directly introduced into the polymerization reactor.

The antisolvent is quickly mixed with the polymerization solvent in which the polymerized product dissolved, and then, the polymerization solvent loses dissolving ability for the polymerized product, resulting in precipitating the polymerized product and generating fine particles. The used antisolvent has a lower dissolving ability for the polymer than the polymerization solvent, and can be selected from $CO_2$, HFCs, HCFCs, $SF_6$, FCs, hydrocarbons, ethers and their mixture. In this case, it may be more preferable that the antisolvent can dissolve compounds affecting a physical property of polymer such as monomers and polymerization intermediates.

In the present invention, solubility of the compounds affecting the physical property of the polymer such as monomer including oligomer with a low molecular weight can be controlled by controlling the temperature and the pressure in the precipitator, whereby the molecular weight distribution can be controlled. Because both of the solvent and the antisolvent are the compressed gases, the solvent and the antisolvent are easily separated from polymer, and the mixture thereof is separated during a separation process and re-circulated to the reactor and the precipitator.

The biodegradable polyester polymer polymerized and prepared in the presence of the above supercritical fluid is obtained in the form of fine powder or the spherical form with a particle size of 0.01~1000 μm. A molecular weight of the biodegradable polyester is $2 \times 10^3 \sim 1 \times 10^6$ g/mol or more.

The present invention has such advantages that, differently from the conventional method, the reaction resulting product does not need washing, and because the solvent used for reaction can be re-cycled, it is environment-compatible. In addition, a stabilizer does not need to be added, and the preparation process can be considerably simplified compared to the conventional multi-step process at a low cost.

The biodegradable polyester with a high molecular weight obtained according to the present invention is inexpensive and can be used for a medical use as well as a general use because there is no residual harmful solvent. Also, the biodegradable polyester of the present invention can be used in the fields of a packing container industry, a highly efficient medical material, a general plastic substitute material, living supplies, disposable articles and agricultural supplies.

The present invention will be explained in more detail in the following examples, It should be understood that these examples are merely illustrative and it is not intended to limit the scope of the present invention by these examples.

EXAMPLE 1

10 g of L-lactide was added in a high pressure reactor of 60 mL, to which 0.2 g of stannous octoate as a catalyst and 0.1 g of 1,6-hexandiole as an initiator were added. HCFC-22 was injected into the high pressure reactor with being pressurized by a high pressure liquid pump. The temperature and the pressure inside the reactor were set at 100° C. and 270 bar, respectively.

When the temperature and the pressure were constant, the polymerization reaction was performed for 2 hours. When polymerization was completed, the reaction product was sprayed into a high pressure precipitator where $CO_2$ flowed.

The obtained polylactide was measured by a Gel Permeation Chromatography (GPC) as that the average molecular weight ($M_w$) was 300,000 g/mol, the molecular weight distribution (MWD) was 1.9, and 93% of yield was obtained.

Observation of the obtained polylactide particle by scanning electronic microscope for measuring the average particle diameter and the distribution of the particle diameter showed that an average particle diameter was 0.6 μm, and distribution of the particles with a diameter of 3 μm or less was 95% (see FIG. 1).

EXAMPLE 2

Except that, after completion of polymerization, the product is sprayed to the air to collect particles, polylactide particles were prepared in the same manner as the example 1. Measurement of the obtained polylactide by the GPC shows that $M_w$ was 290,000 g/mol, MWD was 2.1 and 96% of yield was obtained. Observation of the prepared polylactide particle by scanning electronic microscope for measuring the average particle diameter and the distribution of the particle diameter showed that an average particle diameter was 10 μm, and distribution of particles with a diameter of 100 μm or less was 95%.

EXAMPLE 3

Except that dimethylether (DME) was used as a reaction solvent, polylactide particles were prepared in the same manner as the example 1. Measurement of the obtained polylactide by the GPC shows that $M_w$ was 260,000 g/mol, MWD was 2.0 and 91% of yield was obtained. The average particle diameter of the polylactide was 0.5 μm, and distribution of particles with a diameter of 5 μm or less was 95%.

EXAMPLE 4

Except that HFC-152a was used as a reaction solvent, polylactide particles were prepared in the same manner as the example 1. Measurement of the obtained polylactide by the GPC shows that $M_w$ was 280,000 g/mol, MWD was 1.8 and 94% of yield was obtained. The average particle diameter of the polylactide was 0.5 μm, and distribution of particles with a diameter of 5 μm or less was 95%.

EXAMPLE 5

Except that glycolide was used as monomer, the biodegradable polyester particles were prepared by using the same process as example 1. The obtained polyglycolide had an inherent viscosity of 2.5 and exhibited 95% yield. The average particle diameter of the obtained polyglycolide was 0.7 μm and distribution of particles with a diameter of 8 μm or less was 95%.

EXAMPLE 6

Except that ε-caprolactone was used as monomer, the biodegradable polyester particles were prepared by using the same process as example 1. The obtained polylcaprolactone showed that $M_w$ was 110,000 g/mol, MWD was 1.5 and 80% of yield was obtained. The average particle diameter of the obtained polylcaprolactone was 0.6 μm and distribution of particles with a diameter of 8 μm or less was 95%.

EXAMPLE 7

Except that glycolide and lactide were used as monomer, the biodegradable polyester particles were prepared by using the same process as example 1. The obtained polyglycolide/polylactide copolymer showed that $M_w$ was 250,000 g/mol, MWD was 2.2 and 86% of yield was obtained. The average particle diameter of the obtained polyglycolide/polylactide copolymer was 0.7 μm and distribution of particles with a diameter of 6 μm or less was 95%.

EXAMPLE 8

Except that reaction time was 0.5 hours, biodegradable polyester particles were prepared by using the same process as example 1. The obtained polylactide showed that $M_w$ was 200,000 g/mol, MWD was 1.4 and 92% of yield was obtained. The average particle diameter of the polyglycolide was 0.4 μm and distribution of particles with a diameter of 5 μm or less was 95%.

EXAMPLE 9

Except that a reaction pressure was 60 bar, 1 g of L-lactide, 0.02 g of stannous octoate and 0.1 g of 1,6-hexanediole were added, the biodegradable polyester particles were prepared by using the same process as example 1. The obtained polylactide showed that $M_w$ was 350,000 g/mol, MWD was 2.6 and 97% of yield was obtained. An average particle diameter of the prepared polyglycolide was 0.5 μm and distribution of particles with a diameter of 5 μm or less was 95%.

As so far described, by using compressed gas as solvent, the biodegradable polyester can be obtained in a particle form with a high molecular weight. Therefore, such a crushing process as in the conventional art can be omitted, and because the compressed gas is recovered to be used again, discharging of the solvent harmful to environment can be prevented. In addition, washing of the resulting product can be omitted and a special device and a complicated process can be simplified.

What is claimed is:

1. A method for preparing polyester polymer in a particle form comprising:

adding one or more cyclic monomer in a high pressure reactor;

adding an organic metal catalyst or acid catalyst and an initiator; and pressurizing and injecting a compressed gas solvent selected from the group consisting of HFC-23, HFC-32, HFC-152a, HFC-143a, HFC-134a, HFC-125, HFC-227ea, HFC-236fa, HFC-245fa, HFC-254cb, $SF_6$, HFC-4-10-mee, C-318 (perfluoro cyclobutane), HCFC-22, HCFC-141b, HCFC-142b, HCFC-225ca/cb, dimethylether, $N_2O$, propane, butane and their mixtures, or their mixtures with $CO_2$, to solution-polymerize the monomer.

2. The method of claim 1, additionally comprising the step after polymerization is completed, in which an antisolvent dissolving the reaction solvent but not dissolving the produced polymer to form a single phase is introduced, and thereby the pure polymer is precipitated.

3. The method of claim 2, wherein the antisolvent is directly introduced into a reaction container.

4. The method of claim 2, wherein the polymer in the polymerization-completed reaction container is sprayed into a precipitator and the antisolvent is introduced into the precipitator.

5. The method of claim 2, wherein as the antisolvent, $CO_2$, HFCs, HCFCs, $SF_6$, FCs, hydrocarbon, ether or their mixture is used.

6. The method of claim 1, wherein as the cyclic monomer, one or more selected from the group consisting of lactides, lactones, cyclic carbonates, cyclic anhydrides and thiolactones are used.

7. The method of claim 1, wherein as the cyclic monomer, one or more compounds selected from the group consisting of a compound (A) represented by the general formula (I) and a compound (B) represented by the general formula (II) are used:

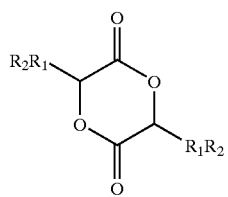

(I)

(wherein $R_1$ and $R_2$ are hydrogen atom or alkyl group of $C_1$–$C_4$)

(II)

(wherein n is an integer of 2 to 5).

8. The method of claim 7, wherein the compound (A) is L-lactide, D-lactide, D,L-lactide, or glycolide.

9. The method of claim 7, wherein the compound (B) is ε-caprolactone.

10. The method of claim 1, wherein two or more monomers are used to be co-polymerized.

11. The method of claim 1, wherein the organic metal catalyst is selected from the group consisting of a tin-based catalyst comprising stannous octoate, stannic chloride, stannous oxide, stannous octylester, stannous chloride dihydrate and tetraphenyl tin; a zinc-based catalyst comprising zinc powder, diethyl zinc, zinc octoate, zinc chloride and zinc oxide; and an aluminum-based catalyst comprising aluminum chloride and aluminum ethoxide.

12. The method of claim 1, wherein the acid catalyst is zinc bis(2,2-dimethyl-3,5-heptanedionato-O,O').

13. The method of claim 1, wherein as the initiator, 1,6-hexanediol is used.

14. The method of claim 1, wherein the compressed gas reaction solvent completely dissolves polymer to perform a uniform solution-polymerization.

15. The method of claim 1, wherein a reaction temperature is 25 to 250° C.

16. The method of claim 1, wherein reaction time is 0.2 to 50 hours, and an yield is 70% or higher.

17. The method of claim 1, wherein a reaction pressure is 40 to 700 bar.

18. The method of claim 1, wherein the amount of monomer is 1~50 wt % based on the supercritical fluid.

19. The method of claim 1, wherein the molar ratio of the catalyst and the initiator is $10^{-4}$ to $10^{-2}$ based on monomer, respectively.

20. A biodegradable polyester homopolymer or copolymer polymerized according to the preparation method of claim 1, which has a molecular weight of 2,000 to 1,000,000 g/mol and a particle size of 0.01 to 1,000 µm, and does not include a residual harmful solvent.

* * * * *